United States Patent [19]

Soga et al.

[11] Patent Number: 5,023,627

[45] Date of Patent: Jun. 11, 1991

[54] PRINTING HEAD

[75] Inventors: Hiroo Soga; Eiichi Akutsu, both of Kanagawa, Japan

[73] Assignee: Fuji Xerox Co., Ltd., Tokyo, Japan

[21] Appl. No.: 430,267

[22] Filed: Nov. 2, 1989

[30] Foreign Application Priority Data

Nov. 29, 1988 [JP] Japan ............................ 63-299492

[51] Int. Cl.$^5$ ............................ G01D 15/10

[52] U.S. Cl. ............................ 346/76 PH

[58] Field of Search ............................ 346/76 PH, 155; 400/120; 219/216 PH, 139 C

[56] References Cited

U.S. PATENT DOCUMENTS 4,630,073 12/1986 Hashimoto ..................... 346/76 PH
4,698,643 10/1987 Nishiguchi et al. ............ 346/76 PH
4,835,552 5/1989 Akutsu et al. ............. 346/76 PH X

FOREIGN PATENT DOCUMENTS 59-171666 9/1984 Japan .
211057 9/1986 Japan ............................ 346/76 PH
270348 11/1987 Japan ............................ 346/76 PH

*Primary Examiner*—Donald A. Griffin
*Attorney, Agent, or Firm*—Finnegan, Henderson, Farabow, Garrett and Dunner

[57] ABSTRACT

A printing head comprising a plurality of printing electrodes positioned in parallel with each other on a surface of an electrically insulating board. Electrically conductive projections are provided in a zigzag format on the exposed portions of an electrically insulating layer of the electrically insulating board near the front edge of the plurality of printing electrodes. The electrically conductive projections are formed such that when they are projected onto a sliding surface by the printing head, the adjacent electrically conductive projections are positioned with a lateral separation distance of 50% or less of the electrically conductive projection width, or with an overlapping portion of 25% or less. Slits are provided between the printing electrodes on at least the front edge of the plurality of printing electrodes.

7 Claims, 5 Drawing Sheets

PRINTING HEAD

BACKGROUND OF THE INVENTION

1. Field of the Invention

This invention relates to a printing head for applying an image-responsive electrical signal to a printing medium.

2. Description of the Prior Art

A printing method, known as electric transfer printing, has been proposed in which an image-responsive electrical signal is changed into heat to melt an ink layer and transfer it to paper, thereby forming an image.

One printing head for such a method comprises integral printing electrodes and return electrodes. Each of the return electrodes has a greater contact area than each of the printing electrodes. (See, for example, Japanese Patent Application (OPI) No. 171666/84 (the term "OPI" as used herein means an "unexamined published application")). Other proposed printing heads include one comprising printing electrodes formed of a metal layer patterned on a ceramic board, or one comprising a lamination of printing electrode materials and ceramic materials.

In the printing head of the former type, the printing electrodes and the return electrodes are provided on a surface which is put in contact with a printing medium, so that the pressure contact area of the printing head is large. For this reason, the total contact pressure needs to be high, which not only makes it difficult to apply a uniform pressure but also requires a large torque for driving rollers. As a result, the reliability of printing performance is low.

To make an image recording with the printing head of the latter type, it is required that the end surface of the printing head be in surface contact with the printing medium. This means that any inclination of the printing head toward the printing medium drastically impairs the contact ratio. Hence, the printing head must always be maintained parallel to the printing medium, which imposes the problem of requiring a highly accurate printing head holding mechanism.

SUMMARY OF THE INVENTION

The object of this invention is, therefore, to provide a printing head in which the reliability of contact between the electrodes and the printing medium is high, a satisfactory contact with the printing medium can be achieved even with a low contact pressure, the life of the printing head is long, and the forming accuracy is high.

One of the present inventors and others previously proposed a printing head having electrically conductive projections near the end surface of the printing head to solve the conventional problems referred to above. However, a further study led them to modify the arrangement of the electrically conductive projections into one disclosed in the present invention.

The printing head according to the present invention, comprises an electrically insulating board, a plurality of printing electrodes positioned in parallel with each other on a surface of the electrically insulating board, an electrically insulating layer having exposed portions near the front edge of the plurality of printing electrodes, and electrically conductive projections, disposed in a zigzag format, provided on said exposed portions. Slits may also be provided between the printing electrodes at least on the front edge of the plurality of printing electrodes.

In the present invention, it is preferable that each of the electrically conductive projections is formed so that when the electrically conductive projection is directed onto a moving printing surface by the printing head, the adjacent electrically conductive projection is positioned with respect to the other electrically conductive projection having either a separation distance in the width direction equal to 50% or less of the width of the electrically conductive projection, or an overlapping portion in the width direction equal to 25% or less.

BRIEF DESCRIPTION OF THE DRAWINGS

The manner by which the above objects, and other objects, features, and advantages of the present invention are attained will be fully apparent from the following detailed description when it is considered in view of the drawings, wherein:

FIG. 1(*b*) is a longitudinal sectional view thereof;

DESCRIPTION OF THE PREFERRED EMBODIMENT

Preferred embodiments of this invention will be described with reference to the accompany drawings.

The printing head according to this invention is used to make an image in an electric transfer printing system or an electrostatic printing system. For example, in the electric transfer printing system, the printing head is put in pressure contact with a printing medium having a heating layer and a fusible ink layer so that the plurality of printing electrodes of the printing head slide over the printing medium. An electric image signal is applied from the printing head to the heating layer, converting electrical energy to heat in the heating layer to fuse the neighboring ink layer, depending on the form of the image. The fused ink layer is transferred to an image receiving material (generally, paper) to make the image thereon for recording.

The printing head of this invention is provided with the electrically conductive projections disposed in a zigzag format near the end surface thereof, such that the adjacent electrically conductive projections are not in direct contact with each other. This allows the width of the projections to be increased and provides an opportunity to increase the contact area of the electrodes. Accordingly, even in the case where the adjacent printing dots must be contiguously combined together during printing, the density of the current flowing through the electrically conductive projections does not increase. This allows the current density to be smaller than the current density of the electrically conductive projections disposed in a straight line. The load of the ink printing medium against the heating layer is likewise small, making it less likely that the ink printing medium will be destroyed.

Further, if slits are positioned between the printing electrodes, the printing electrodes can be brought into pressure contact either individually or in small groups. Hence, infiltration of any foreign matter such as dust into a printing electrode will not cause the entire printing head to be in loose contact, or even if a part of the printing head is put in loose contact, such a level of loose contact is less likely to affect the contact condition of other electrodes.

Figure 1A:
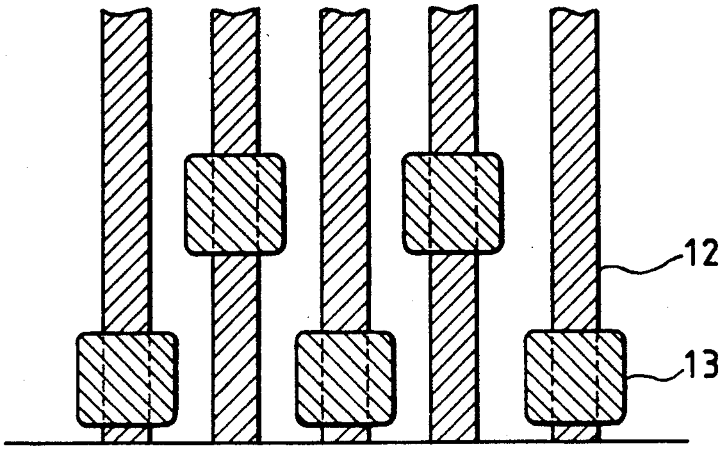
FIG. 1(*a*) is a plan view of an embodiment of the printing head according to this invention.
Figure 1B:
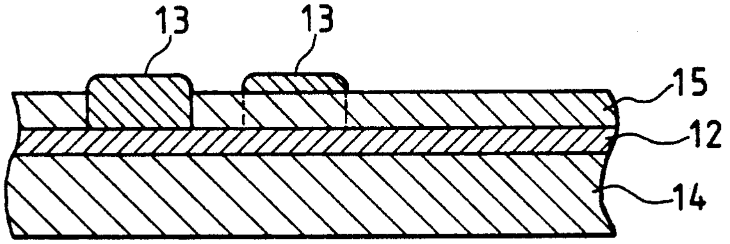

FIG. 1 is a first embodiment of this invention; (a) is a plan view, and (b) is a longitudinal sectional view. On a surface of an electrically insulating board 14, a plurality of patterned printing electrodes 12 are positioned in parallel with each other, each of the printing electrodes being coated with an electrically insulating layer 15 except for a portion near the front edge thereof. Exposed portions which are not coated with the electrically insulating film are provided with electrically conductive projections 13.

The electrically insulating board is made of an electrically insulating material, a rigid metal body on which an electrically insulating material is deposited, or the like. The electrically insulating material may include electrically insulating resins such as polyester, polyvinyl chloride, polyurethane, polyorganosilicone, polyacetal, polyimide resin, polyamide resin, polyacrylate, polyurea, and epoxy resin. Elastomer may also be used. When the electrically insulating board is made of an electrically insulating resin, it is preferable that the thickness of the board be 0.1 mm to 7 mm. If the thickness is smaller than 0.1 mm, the printing head cannot be in contact with the printing medium under sufficient elastic pressure, while if the thickness is greater than 7 mm, the board acts as a rigid body, such that the printing head cannot be maintained in continuous contact with the printing medium at a stable pressure. When an aluminum or other rigid metal body is used, the surfaces must be provided with an electrically insulating layer, or preferably, an electrically insulating elastic layer.

On the electrically insulated board a plurality of printing electrodes are positioned in parallel in a strip format. The material that can be used includes any of electrically conductive metals selected from the group consisting of Ni, Cr, Au, Cu, Ta, Ti, Fe, Al, Mo, W, Zn, Sn, Pt, Pb, and an alloy containing such a metal; electrically conductive metal compounds such as $VO_2$, $RuO_2$, TaN, $Ta_2N$, $HfB_2$, $TaB_2$, $MoB_2$, $B_4C$, MoB, ZrC, VC, TiC; and a mixture containing such a metal or such a metal compound. The specific volume resistivity required of these materials should be $10^{-4}\Omega$.cm or less. When the printing electrodes are to be provided on the electrically insulating board, an electrically conductive film of between approximately 0.1 $\mu$m and 50 $\mu$m in thickness may be formed on the board from any of the above-mentioned electrode materials by one of the following methods (depending upon the materials used for the printing electrodes and the electrically insulating board): foil adhesion, electrolytic plating, electroless plating, vacuum evaporative deposition, sputtering, printing and other coating, physical vapor deposition, chemical vapor deposition, plasma filming, or the like. To form the printing electrodes in a strip format, a film of an electrically conductive layer may be patterned by combining lithography—based on ordinary light, laser beam, or electron beam—with either wet or dry etching. The printing electrodes may otherwise be made by subjecting the electrically conductive layer to a direct printing.

The printing electrodes thus formed are then coated with an electrically insulating layer. Such coating is made so that the printing electrodes will be exposed in a zigzag format near the front edge. The coating may be implemented in the following manner. An electrically-insulating photosensitive film (dry film) is fusion-bonded under pressure on the printing electrodes, and then removed by photolithography and wet etching, so that portions of the printing electrodes which will be put in contact with the printing medium are exposed. In place of the electrically-insulating photosensitive film, an electrically insulating film may be subjected to fusion-bonding under pressure to expose the portions of the printing electrodes by the combination of photolithography and dry etching using a resist film. The thickness of the electrically insulating film is preferably in the range of approximately 5 $\mu$m to 50 $\mu$m.

The electrically conductive projections are formed on the portions of the printing electrodes which are not subjected to coating with the electrically insulating layer, that is, the exposed portions. The electrically conductive projections may be formed by bonding, for example, an electrically conductive metal such as Ni, Cr, and Cu to the exposed portions on the printing electrodes by electrolytic plating so that the projection is thicker than the thickness of the electrically insulating film.

Figure 3:
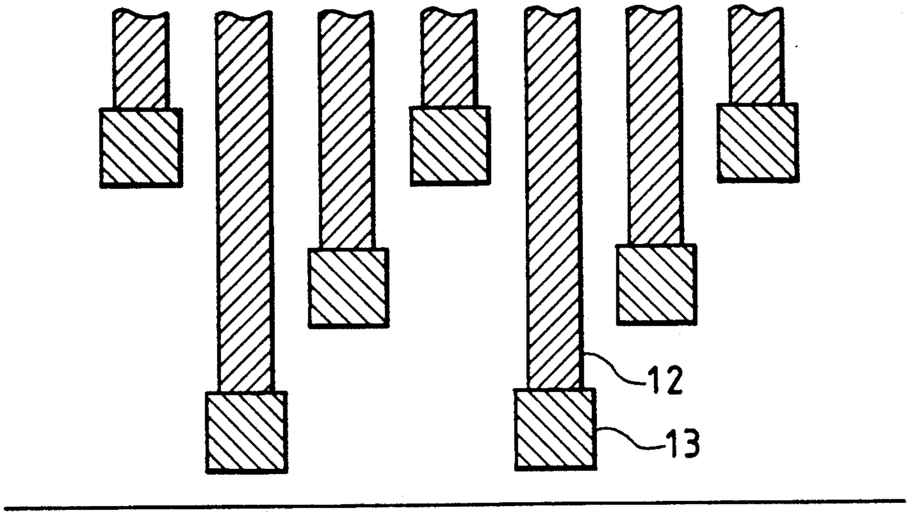
FIGS. 3 and 4 are plan views of other embodiments of the printing head according to this invention.
Figure 4:
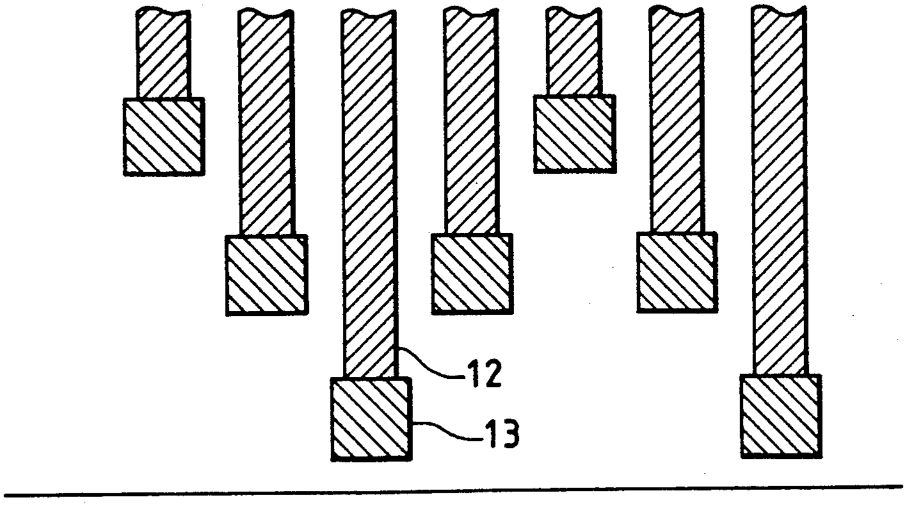

The best mode of the present invention requires that the electrically conductive projections be in a zigzag format, but their format is not confined thereto and may be of such an arrangement as shown in FIG. 1 or of such a sawtooth arrangement formed by three or more electrodes as shown in FIGS. 3 and 4.

Figure 5:
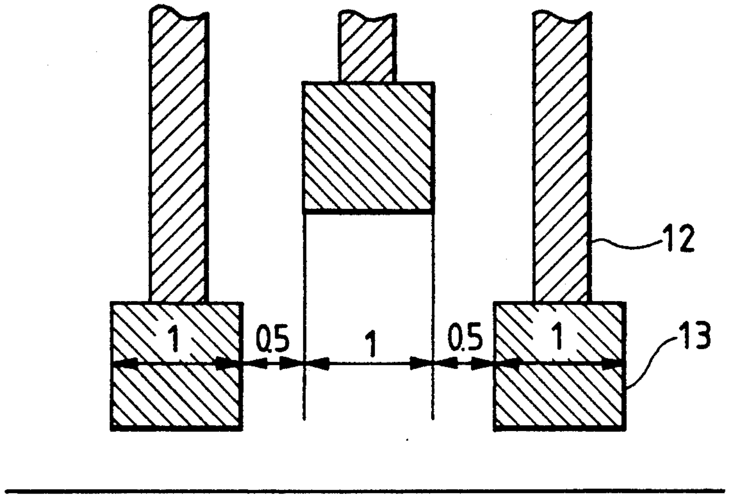
FIGS. 5 and 6 are explanatory drawings showing the relevant distances of the adjacent electrically conductive projections.
Figure 6:
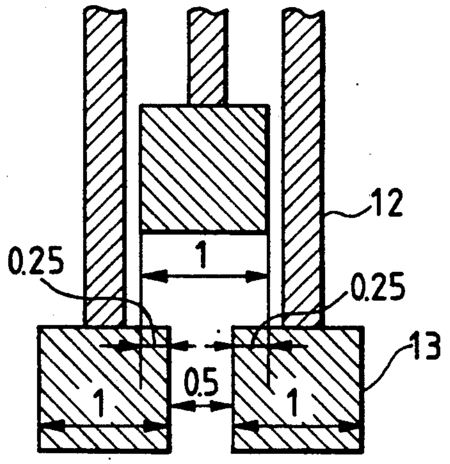

The electrically conductive projections provided on the printing electrodes are mutually spaced apart. It is preferable that when an electrically conductive projection is projected onto a sliding surface by the printing head, the adjacent electrically conductive projection be positioned with respect to the other electrically conductive projections having either a lateral separation distance equal to 50% or less of the width of the electrically conductive projection (hereinafter referred to as "projected distance," an arrangement with a projected distance equal to 50% being shown in FIG. 5), or an overlapping portion equal to 25% or less (the arrangement with an overlapping portion equal to 25% being shown in FIG. 6).

Figure 9:
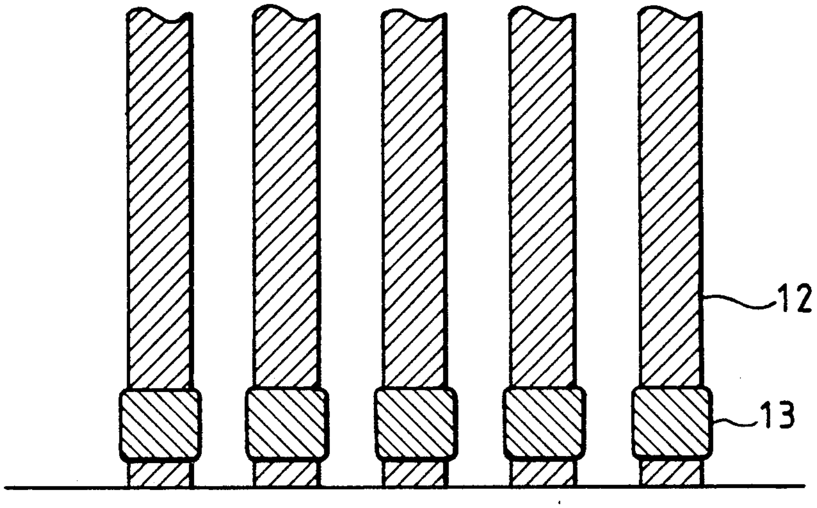
FIG. 9 is a plan view of a comparative example of a printing head.
Figure 10:
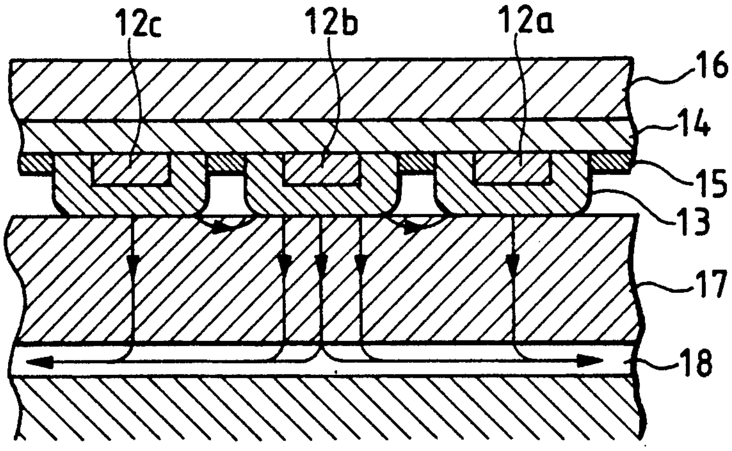
FIG. 10 is an explanatory drawing showing the flow of currents in the case where the comparative printing head is used.

Any arrangement of the electrically conductive projections with a projected distance greater than 50% may reduce the advantage to be provided by positioning them in a zigzag form. When the electrically conductive projections are arranged in a straight line, as shown in FIG. 9, the distance therebetween can be made 50% or less. However, under a condition in which a voltage is applied to one printing electrode but not to the other adjacent printing electrode as shown in FIG. 10, the current shown by the arrow is generated causing it to flow to other printing electrodes in which no signals are present, resulting in an energy loss. In FIG. 10, reference numerals 12*a* and 12*c* denote the printing electrodes to which no signal voltage is applied; 12*b* denotes the printing electrode; 13 denotes the electrically conductive projection; 14 denotes the electrically insulating board; 15 denotes the electrically insulating layer; 16 denotes the elastic body; 17 denotes the heating layer of the ink printing medium; and 18 denotes the return electrode layer.

The arrangement of the electrically conductive projections with an overlapping portion greater than 25% leads to reprinting of a dot, thereby again resulting in an energy loss. Further, since the width of each printing electrode must be narrower, a high density printing head cannot be manufactured with this arrangement. Moreover, its wiring resistance becomes so large that it may constitute another source of energy loss.

Figure 2:
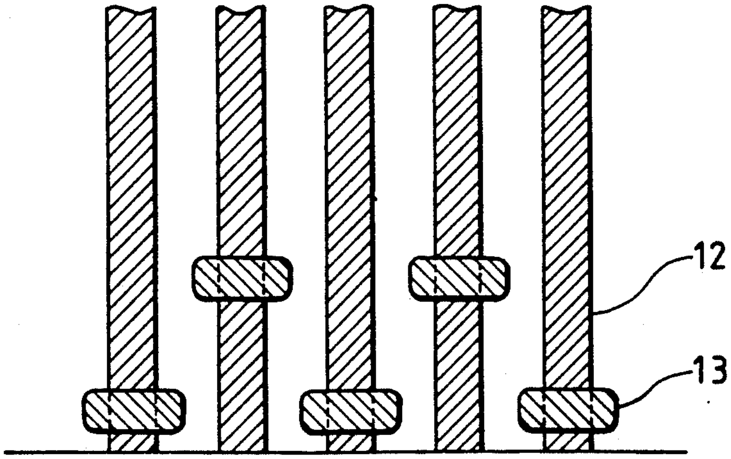
FIG. 2 is a plan view of another embodiment of the printing head according to this invention.

The form of the electrically conductive projections according to this invention may either be square as shown in FIG. 1 or rectangular with the side in the printing electrode width direction being longer as shown in FIG. 2.

Figure 8A:
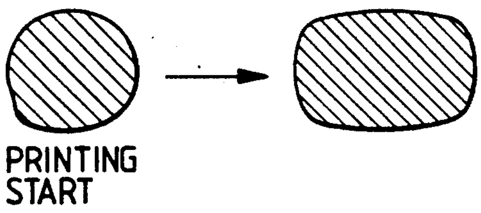
FIG. 8 is an explanatory drawing showing the form of a transferred dot.
Figure 8B:
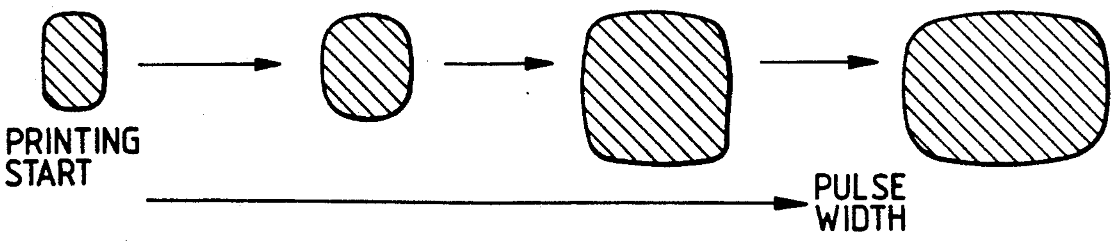

The electrically conductive projection in such a rectangular form as described above has a smaller electrode area than that of the square form. The form of a dot at printing start is thin and long, and small in area as shown in FIG. 8. If the widthwise form of a pulse to be applied is made longer, the form of the dot becomes correspondingly long. The dot adjustment can be made by the pulse width, and a high resolution image can be supplied. Accordingly, it is preferable in this invention that the side of the electrically conductive projection in the printing electrode width direction be longer than the side in the printing electrode length direction. An especially preferable relation between these adjoining sides is as follows:

$$\frac{\text{Length of side in the printing electrode width direction}}{\text{Length of side in the printing electrode length direction}} > 4$$

It is further desirable that the electrically conductive projection is provided so that it projects approximately 2.0 μm to 100 μm, or more preferably, approximately 10 μm to 40 μm from the electrically insulating layer.

In the printing head according to this invention, slits may be provided between the printing electrodes on at least the front edge of the plurality of printing electrodes. The slits may be formed by rotary cutting with a cutting disk, laser processing, dry etching, fluid cutting, or the like. The length of the slit is preferably in the range of approximately 5 mm to 40 mm from the printing head edge. However, the length of each slit is of such a nature as to be arbitrarily determined depending on the form of the exposed portion of the printing electrode, so that there is some flexibility.

More detailed embodiments of the printing head according to this invention will now be set forth.

Embodiment 1: A polyimide film of 30 μm in thickness was used as an electrically insulating film for forming an electrode. On this film a copper foil of 20 μm thickness was deposited and bonded by a thermosetting bonding agent as an electrode material. The bonded copper foil was then patterned by means of photolithography and etching so that the printing electrodes of 65 μm in width were formed at intervals of 125 μm in a strip format.

A thermosetting polyimide resin solution was then applied on the formed printing electrode side, and heated and hardened to provide an electrically insulating layer of 20 μm in thickness. The thermosetting polyimide resin was removed by photolithography and etching to form, on each printing electrode, an opening having a square cross-sectional shape 120 μm on each side. The array of these square openings was so provided that a zigzag was formed in a direction orthogonal to the printing electrodes.

Nickel was deposited on the square openings by electroplating so that it projected 15 μm from the electrically insulating layer and projections made of nickel, such as shown in FIG. 1, were formed.

To make the projections provided on the printing electrodes serve as the contact electrodes of the printing head, in one embodiment a conventional wiring board was reduced in substrate thickness to provide a height 21 μm below the array of projections. Then, upon the surface, upon or above which the projections were arranged, this wiring board, an insulating silicone rubber board of 1 mm in thickness, and a ground plane aluminum board of 3 mm in thickness were disposed in this order and bonded by a thermosetting bonding agent. In the bonding operation the edge of each material was aligned so that the array of the projections on the wiring board could be put appropriately in alignment with, and to contact selected ones of, the printing head edges. The result of this arrangement is to provide individual electrical connections for each printing head electrode.

Embodiment 2: A printing head was fabricated by the same method as in embodiment 1, except that the dimensions of the opening of the electrically insulating layer on the printing electrode were 120 μm×30 μm, with the longer side of the opening being aligned in the width direction of the printing electrode. The arrangement of the openings is as shown in FIG. 2.

Comparative Embodiment: A printing head was fabricated by the same method as in embodiment 1, except that the dimensions of the opening of the electrically insulating layer on the printing electrode were 65 μm×65 μm. The arrangement of the openings was in a straight line as shown in FIG. 9.

Figure 7:
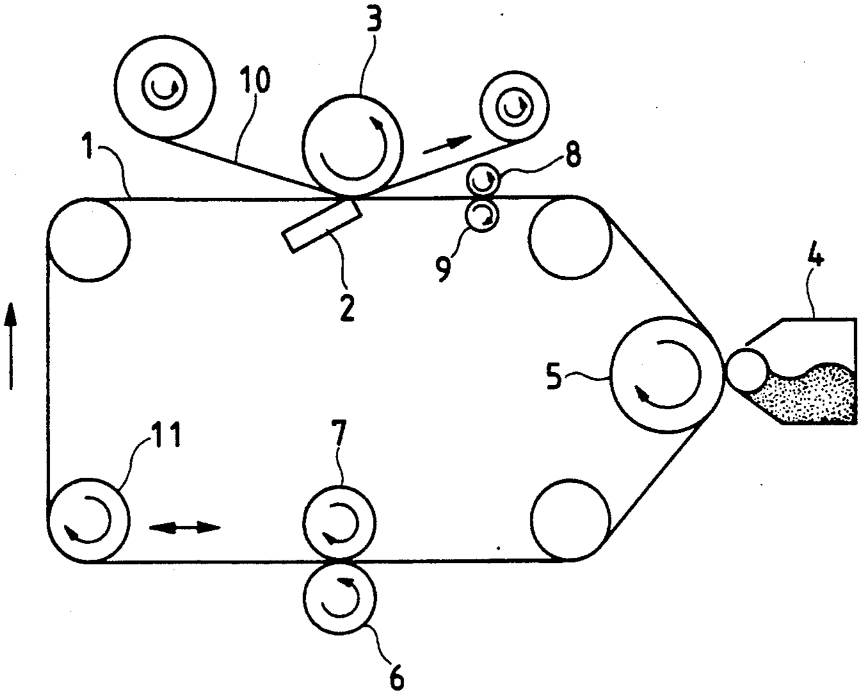
FIG. 7 is a schematic diagram showing the construction of a printing device.

Evaluation Method 1: Printing conditions of each printing head were evaluated using the printing device shown in FIG. 7.

The printing device comprises ink printing medium 1, which is stepped forward by a forwarding drive roller 5. An electric signal is applied from a printing head 2 to the ink printing medium, and the current is grounded from a return connection roller 8 disposed in opposition to a backup roller 9 via a return electrode layer of the printing medium. The ink layer is fused by the heat generated by heating layer 17 (see FIG. 10) of the printing medium and transferred to a printed object 10 on a platen roller 3. Reference number 9 denotes a backup roller for ensuring the contact with the return connection roller. Upon the end of printing, an ink supplier 4 supplies an ink to the portion of the ink printing medium from which the ink was transferred, and the surface thereof is conditioned by a heat roller 6 disposed in opposition to a backup roller 7. Reference numeral 11 denotes a tensioning roller.

The above ink printing medium 1 comprises an electrically conductive polyimide film of 20 μm in thickness as a heating layer; an aluminum layer of 1000 Å in thickness as a return electrode layer 18; a silicone resin layer of 0.4 μm in thickness as an ink separating layer; and a polyester resin ink layer of 6 μm in thickness as an ink layer.

The printing heads subject to the evaluation were those according to embodiments 1 and 2, and of the comparative embodiment.

A test printing was made of each of the above printing heads by applying appropriate energy thereto so that the adjacent dots were contiguously printed to form a solid, densely printed image without any loose dots, and the surface conditions of the ink printing mediums were then compared.

In cases of embodiments 1 and 2, the surface of the ink printing mediums presented wear markings made by the printing head, but no breakage was found. In the case of the comparative embodiment, however, a number of breakage markings in grain form due to carburization were present.

The printing head according to the embodiments of this invention can provide a solid, densely printed image by printing dots whose size is the same as the electrode area, while the printing head according to the comparative embodiment cannot form a solid, densely printed image without printing dots whose size is four times the electrode area; however, the electrically conducted area is substantially the same as the electrode area. Thus, in the printing head according to the embodiments of this invention, the electrically conducted area is substantially the same as the size of the transferred dot and the energy can be uniformly applied to the ink printing medium, making it not subject to breakage. In contrast, in the printing head according to the comparative embodiment, the electrically conducted area is small with respect to the transferred dot, which leads to a concentration of energy with resultant breakage of the ink printing medium.

Evaluation Method 2: Ink transfer tests were made by rotating the forwarding drive roller at a constant analog speed using the printing device shown in FIG. 7.

The printing heads of embodiments 1 and 2, and of the comparative embodiment were caused to print a solid, densely printed image in the same manner as in evaluation method 1 to check for any breaking conditions present on the surface of each of the ink printing mediums.

The printing head according to the comparative embodiment presented a breakage on its ink printing medium as was the case with evaluation method 1, while the printing heads according to embodiments 1 and 2 had no breakage.

One-dot transfer tests were then made under varying pulse widths to form the solid, densely printed image. The result was such a dotted image as shown in FIG. 8. In other words, in the printing head according to embodiment 1, whose electrode form was square, there was a correspondence between the form of the printed image and the smallest dot printed at printing start. In the printing head according to embodiment 2, whose electrode had an oblong form and a smaller area than embodiment 1, there was likewise a correspondence between the form of the printed image and the smallest dot printed at printing start, which was likewise oblong and small in size. The size of a dot increased with increasing pulse width, thereby allowing the dots to be adjusted in accordance with the pulse width. It was found out that the printing head according to embodiment 2, whose dot printed at printing start was smaller, could provide an image with a better resolution.

Advantages: The printing head according to the present invention comprising the electrically conductive projections on the printing electrodes arranged in a zigzag format allows a good contact to be maintained between the projections and the printing medium even under a small contact pressure. This contributes to lengthening the life of the printing head as well as reducing the wear of the printing medium. Compared to the arrangement in a straight line, the electrically conductive projections disposed in zigzag format can increase the electrode area, thereby reducing the current density and loads to be applied to the heating layer of the ink printing medium. This prevents the ink printing medium from being broken.

In the case where slits are provided between the printing electrodes, the following advantages are available:

1) Any loose contact with the printing electrode due to infiltration of foreign matter such as dust or other contaminants does not cause the entire printing head to become loose with respect to the printing medium; the position of the printing head in pressure contact, variation in pressure due to erratic accuracy, or single-sided contact can be prevented; and any partially loose contact does not affect the contact conditions of other printing electrodes;

2) Any fine foreign matter can be dropped off into the slits, thereby allowing any foreign matter to be removed; and 3) The reliability of contact of each printing electrode is enhanced, whereby it is possible to reduce contact pressure, and contribute to improving the wear resistance of the ink printing medium and the reliability and life of the printing electrode contact point.

What is claimed is:

1. A printing head, comprising:

an electrically insulating board;

a plurality of printing electrodes positioned parallel to each other on said electrically insulating board, said plurality of printing electrodes terminating adjacent a front edge of said electrically insulating board;

an electrically insulating layer overlaying said electrically insulating board and said plurality of printing electrodes; and electrically conductive projections, each having a selected width greater than the width of one of said plurality of printing electrodes, and each in ohmic contact with one of said plurality of printing electrodes through said electrically insulating layer, said electrically conductive projections being disposed in a zigzag format relative to said front edge.

2. The printing head according to claim 1, wherein slits are provided between adjacent ones of said plurality of printing electrodes, said slits extending a selected distance from said front edge.

3. The printing head according to claim 1, wherein adjacent ones of said plurality of printing electrodes are laterally disposed to define a range of lateral spacing between adjacent electrically conductive projections, said range corresponding to a maximum lateral separation of approximately 50% of the width of the electrically conductive projection, to a minimum lateral separation corresponding to an overlap of approximately 25% of the width of the electrically conductive projection.

4. The printing head according to claim 1, wherein said electrically conductive projections are disposed in a saw-tooth format.

5. The printing head according to claim 1, wherein each said electrically conductive projection has similar length and width dimensions.

6. The printing head according to claim 1, wherein each said electrically conductive projection has a width dimension greater than a length dimension.

7. A printing head, comprising:

an electrically insulating board;

a plurality of printing electrodes positioned parallel to each other on said electrically insulating board, said plurality of printing electrodes terminating adjacent a front edge of said electrically insulating board;

an electrically insulating layer overlaying said electrically insulating board and said plurality of printing electrodes; and a plurality of electrically conductive projections, each of said plurality of electrically conductive projections having a selected width, each being in ohmic contact with one of said plurality of printing electrodes through said electrically insulating layer, and each being disposed a distance from said front edge different than an adjacent electrically conductive projection, wherein adjacent ones of said plurality of printing electrodes are laterally disposed to define a range of lateral spacing between adjacent electrically conductive projections, said range corresponding to a maximum lateral separation of approximately 50% of the width of the electrically conductive projection, to a minimum lateral separation corresponding to an overlap of approximately 25% of the width of the electrically conductive projection.

* * * * *